(12) United States Patent
Gilks

(10) Patent No.: US 11,844,332 B1
(45) Date of Patent: Dec. 19, 2023

(54) ALONGSIDE LEASH PET WASTE BAGS DISPENSER AND KEYS/CASH AND THE LIKE HOLDER

(71) Applicant: Tina M Gilks, New York, NY (US)

(72) Inventor: Tina M Gilks, New York, NY (US)

( * ) Notice: Subject to any disclaimer, the term of this patent is extended or adjusted under 35 U.S.C. 154(b) by 309 days.

(21) Appl. No.: 16/427,384

(22) Filed: May 31, 2019

(51) Int. Cl.
*A45C 11/32* (2006.01)
*A01K 27/00* (2006.01)
*E01H 1/12* (2006.01)

(52) U.S. Cl.
CPC .......... *A01K 27/008* (2013.01); *A45C 11/321* (2013.01); *E01H 1/1206* (2013.01); *E01H 2001/128* (2013.01); *E01H 2001/1273* (2013.01)

(58) Field of Classification Search
CPC ........... E01H 2001/1273; A45C 11/321; A45C 11/182; A01K 27/008
See application file for complete search history.

(56) References Cited

U.S. PATENT DOCUMENTS

| | | | | |
|---|---|---|---|---|
| 5,727,500 A * | 3/1998 | Conboy | ............... | A01K 23/005 119/174 |
| 6,085,695 A * | 7/2000 | Miller | .................. | A01K 27/006 119/795 |
| 9,078,417 B1 * | 7/2015 | Lees | .......................... | A45F 5/04 |
| 2010/0269763 A1 * | 10/2010 | Kraft | .................... | A01K 27/006 119/795 |
| 2015/0144072 A1 * | 5/2015 | Whitefield | ........... | A01K 27/008 119/795 |
| 2015/0257370 A1 * | 9/2015 | Craig | ................... | A01K 27/008 224/218 |
| 2016/0113365 A1 * | 4/2016 | Lank | ........................ | A45C 3/00 383/40 |

* cited by examiner

*Primary Examiner* — Daniel J Colilla

(57) ABSTRACT

The present invention relates to a novel alongside pet leash multi-purpose pouch capable of holding up to two pet waste bag rolls, as well as keys/cash/credit cards and the like. More particularly, the invention relates to a two sided neoprene pouch with a space in between the two sides that slides into any size and width leash, and it is attached to the leash by embracing it, being longitudinally aligned to said leash, capable of holding two pet waste bag rolls, keys, cash, or any smaller trivial item that might come in need when utilizing the product for its means.

1 Claim, 5 Drawing Sheets

ALONGSIDE LEASH PET WASTE BAGS DISPENSER AND KEYS/CASH AND THE LIKE HOLDER

BACKGROUND

Pets have always been an important part of many households. The care for animals has grown so much in the past years that new occupations such as dog walkers, pet sitters and even digital applications designed to facilitate dog walkers and track your pet have emerged to assist with the animal care and convenience of the owner.

The vast majority of pet owners live in urban areas and have the civil obligation to pick up after their pets. A pet waste bag and pet waste bag dispenser that holds one pet waste bag roll exclusively and hangs from the pet's leash is a widely known and commercialized concept.

However, these dispensers suffer many drawbacks that may inconvenience the user. At a first glance, these dispensers are generally made out of plastic with a rotating cap allowing the owner to insert the pet waste bag roll. One of the problems is that, these caps, per its own purposes of rotating in and out, become sensitive to the rotation mechanism after a while and can easily come undone without much effort. Secondly, the hard surface of the plastic, combined with the intense use that these gadgets are often subject to brake or crack, making it impossible to hold the roll in place. Thirdly and more importantly, the fact that such dispenser dangles from the leash presents little problems if the user only has one animal to conduct. It becomes a real problem walking two or more pets at once with those gadgets attached to one (or all) of the leashes as they very easily tangle together making the task at hand very difficult.

Another drawback is that the dispensers can only hold one pet waste bag roll at a time. Causing the user an additional concern before leaving the house to walk a pet, namely to check if one has enough bags to go around.

Furthermore, since pet walking is generally an outside activity, there is an utmost need to ensure one has keys to re-enter the house/establishment. As discussed further, this novel pet waste bags dispenser and keys/cash pouch has a compartment with a key chain clip attached to it capable of holding keys, cash, credit cards or any item that one should need when utilizing the product. None of the pet waste bag dispenser currently in the market possesses such differential.

Finally, as exposed above, a need for a product that: (i) attaches alongside a leash, not dangling from it; (ii) not made out of plastic; (iii) capable of holding more than one pet waste bags at a time; (iv) and capable of holding keys, cash and the like exists and it has a high potential to be commercialized.

BRIEF SUMMARY OF THE INVENTION

The present invention consists of a novel two-sided pouch attachable alongside any size and width leash, containing a compartment capable of holding two pet waste bags rolls on one side and a compartment containing a key chain and clip, capable of holding keys, cash, credit cards and the like on the other side, allowing a space between compartments in which the leash slides through. The pouch is made of polychloroprene (popularly known as neoprene) a flexible, washable synthetic fabric/rubber that is resistant to a wide temperature range ideal for outdoors use.

BRIEF DESCRIPTION OF THE DRAWINGS

FIG. 6 is a bottom perspective view showing the side slit destined to dispense the pet waste bags and the bottom slit through which the leash slides in between.

DESCRIPTION OF THE PREFERRED EMBODIMENT

Figure 1:
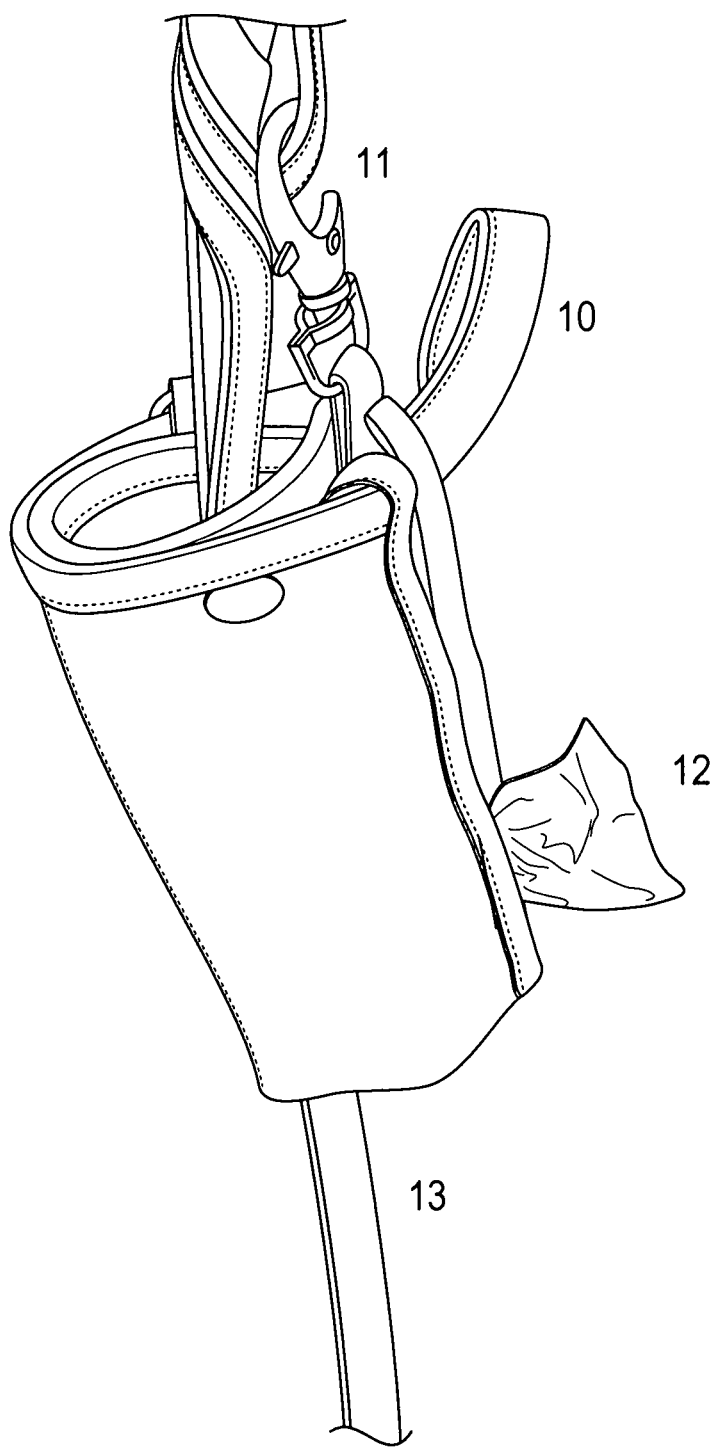
FIG. 1 is a perspective view of the front of the present invention displaying the compartment destined to be a 2 pet waste bag rolls holder and dispenser pouch illustrating how the present invention slides in and is attached alongside the leash without any prominent parts dangling or hanging from the leash according to the preferred embodiment of the present invention.

The present invention relates to a pouch placed alongside a leash which compromises a two-side pocket structure capable of holding on one side two pet waste bag rolls and on the other side keys, cash, credit cards and the like. The present invention is constructed in an anatomic way intended to be attached alongside any shape, size or width leash, collar or harness; light in weight; easy to manufacture in a low cost manner; and easy to commercialize.

The pouch is made of polychloroprene (popularly known as neoprene) a flexible, washable synthetic fabric/rubber that is resistant to a wide temperature. The pouch structure is 5 and a quarter inches in length with an elastic band trim (reference 10) and a keychain (reference 11) clasp on the top that attaches to the leash (FIGS. 1, 2, 3, 4, 5 and 6). The purpose of the elastic band and clasp is to hold the pouch in place at the top edge of the leash (reference 13 on FIGS. 1 and 2). The pouch has a double structure, with two compartments, one in the front and one in the back.

The front pocket is capable of holding two pet waste bag rolls. It possesses a slit on the bottom (reference 12) intended to dispense the bags easily by pulling them out, one by one, according to the preferred embodiment of the present invention displayed on FIGS. 1, 2, 3 and 4.

The back pocket consist of a keychain clasp (reference 14) capable of holding any type of key chain or key hole and deep enough to hold cash, credit cards or any other item one may need when utilizing the present invention for its means, according to the preferred embodiment of the present invention displayed on FIGS. 2, 3, 4 and 6.

Figure 5:
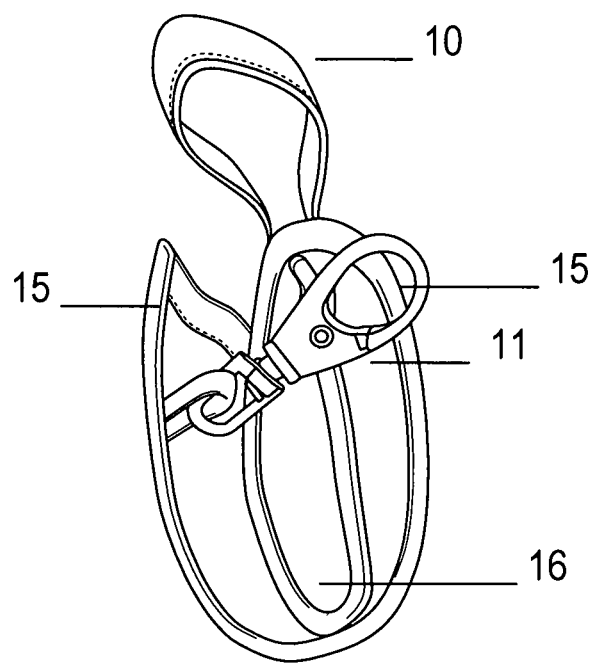
FIG. 5 is a top perspective view showing the slit, ring and clip destined to keep the present invention attached alongside the leash.
Figure 6:
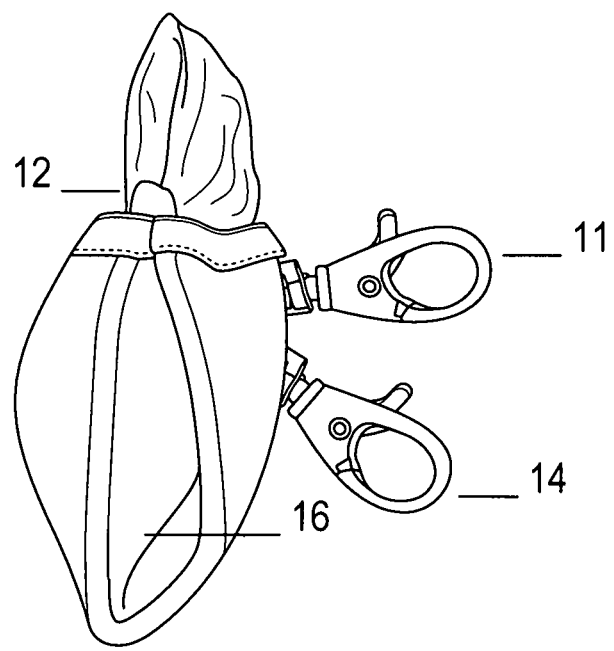

Between both compartments described above there is a space where the leash slides on (reference 16) according to the preferred embodiment of the present invention displayed on FIGS. 5 and 6.

Figure 2:
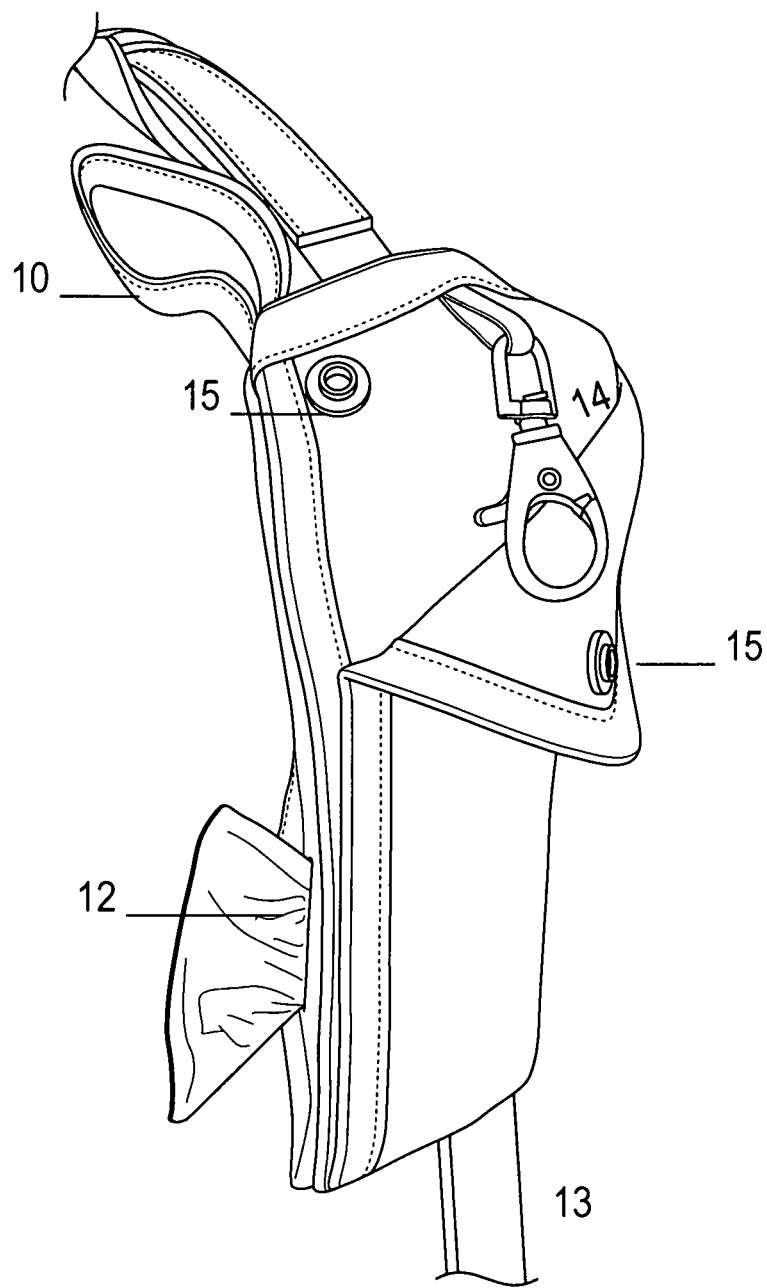
FIG. 2 is a perspective view of the back of the present invention displaying the compartment destined to be a keys/cash/credit card and the like holder, which includes a key chain ring and clasp capable of snatching any size key chain or key hole according to the preferred embodiments described within.
Figure 3:
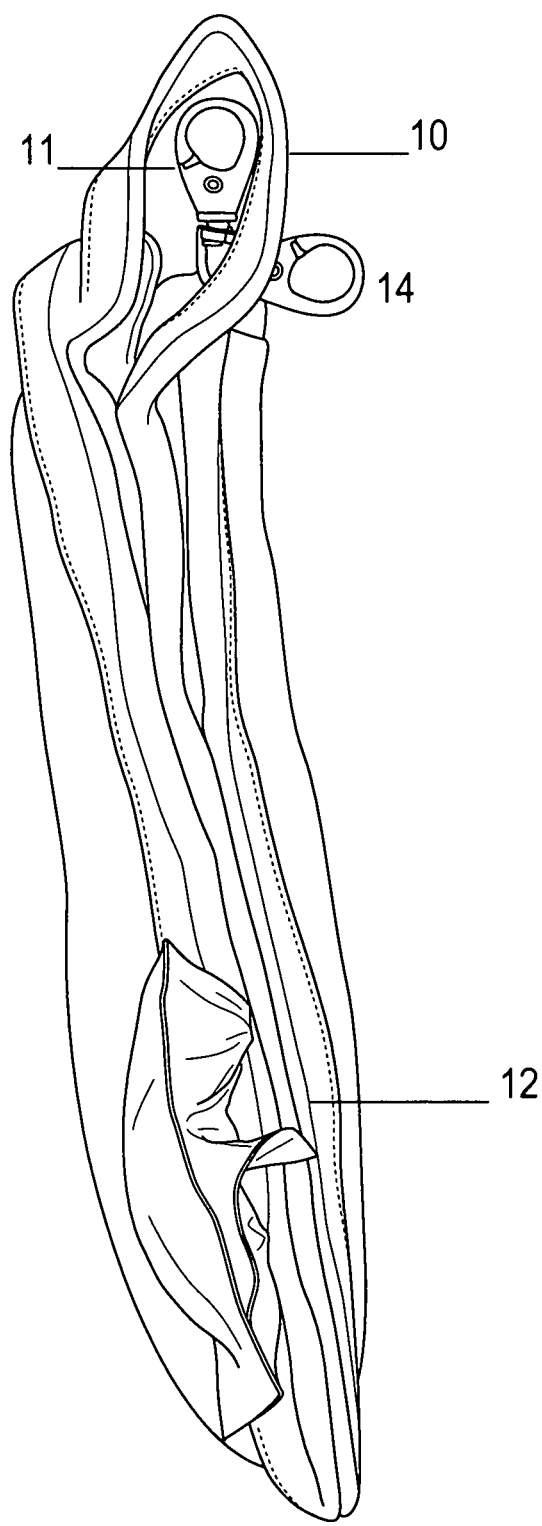
FIG. 3 is a lateral perspective view of the present invention, emphasizing the mechanism in which the pouch is held in place by an elastic band trim adjustable to any width of leash according to the preferred embodiment of the present invention.
Figure 4:
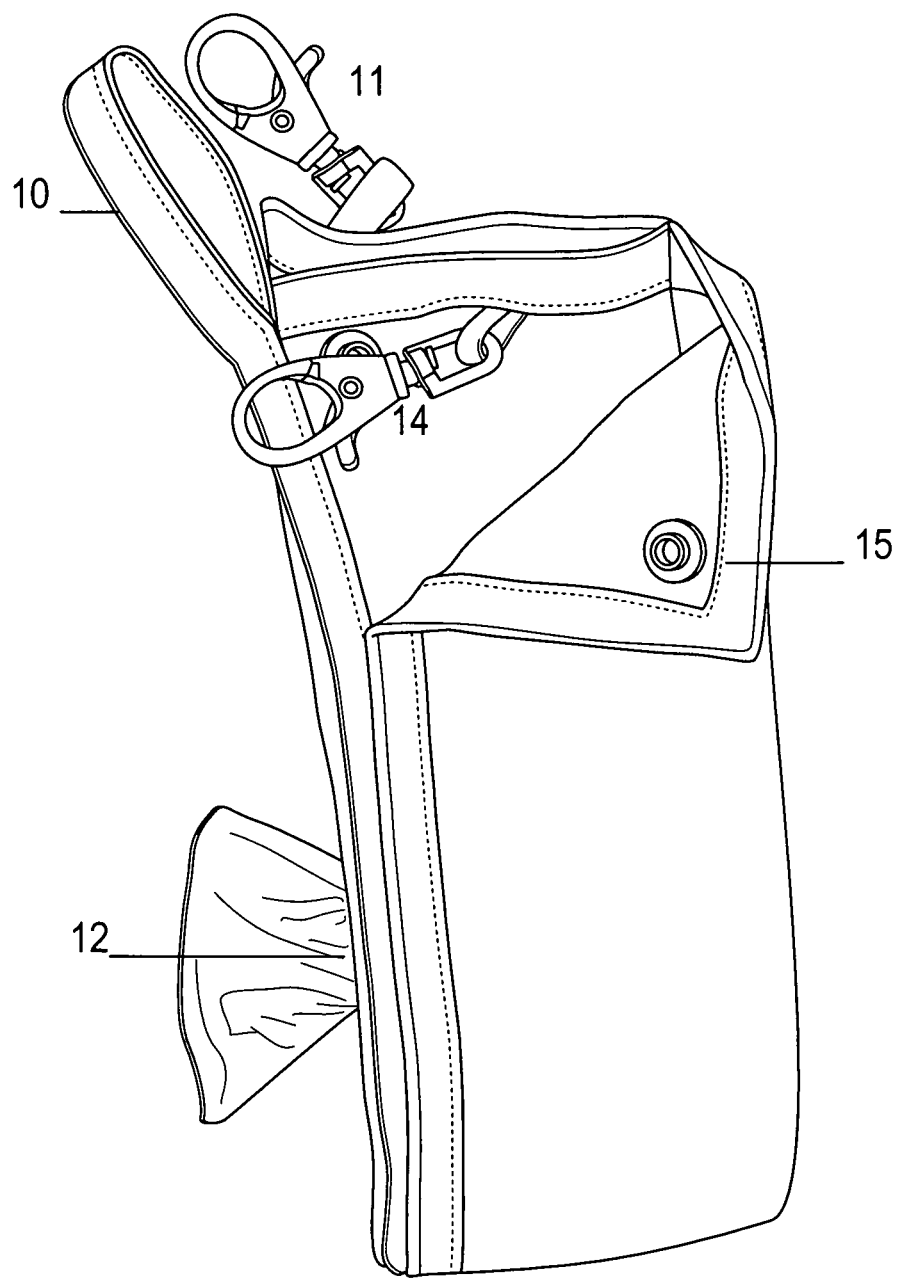
FIG. 4 is a rear side view of the present invention displaying the open pouch and the key chain holder/clip, destined to hold keys and/or any small objects to the preferred embodiment of the present invention.

There are two pressure buttons (reference 15) on the top end of each compartment allowing the user to refill the bags and insert belongings (FIGS. 2, 3 and 4).

Although the present invention has been illustrated and described herein with reference to preferred embodiments, it will be readily apparent to the reasonable man that other embodiments may perform similar functions. All such embodiments are within the scope of the present invention, are contemplated thereby, and are intended to be covered by the following claims.

The invention claimed is:

1. A dog walking pouch, comprising:
   a first compartment on a front side of the dog walking pouch, said first compartment configured to contain two rolls of dog waste bags that are longitudinally arranged on a common center axis;
   a second compartment on a back side of the dog walking pouch, configured to at least contain a cellular phone;
   a second clasp disposed in the second compartment and attached at the top of the second compartment; and
   an elastic band disposed at a top end of the dog walking pouch including a first clasp at one end of the elastic band,
   wherein the first compartment comprises a first flap, a first fastener in a corner of the first compartment, and a second fastener on the first flap, said first and second fasteners configured for closing the first compartment, and said first compartment further comprising a slit at the bottom of the first compartment configured to dispense dog waste bags, one by one,
   wherein the second compartment comprises a second flap, a third fastener in a corner of the second compartment, and a fourth fastener on the second flap, said third and fourth fasteners configured for closing the second compartment; and
   wherein the first compartment has a first longitudinal edge and a second longitudinal edge and the second compartment has a third longitudinal edge and a fourth longitudinal edge,
   wherein the first longitudinal edge is connected to the third longitudinal edge and the second longitudinal edge is connected to the fourth longitudinal edge thereby forming a central passage between the first compartment and the second compartment,
   wherein the central passage is configured to receive the dog leash,
   wherein the first clasp at one end of the elastic band is configured to attach to the dog leash, and
   wherein the dog walking pouch is made from polychloroprene.

* * * * *